May 29, 1956 F. C. WARNE 2,747,355
TRACTOR DRAWN IMPLEMENTS
Original Filed June 12, 1944 2 Sheets-Sheet 1
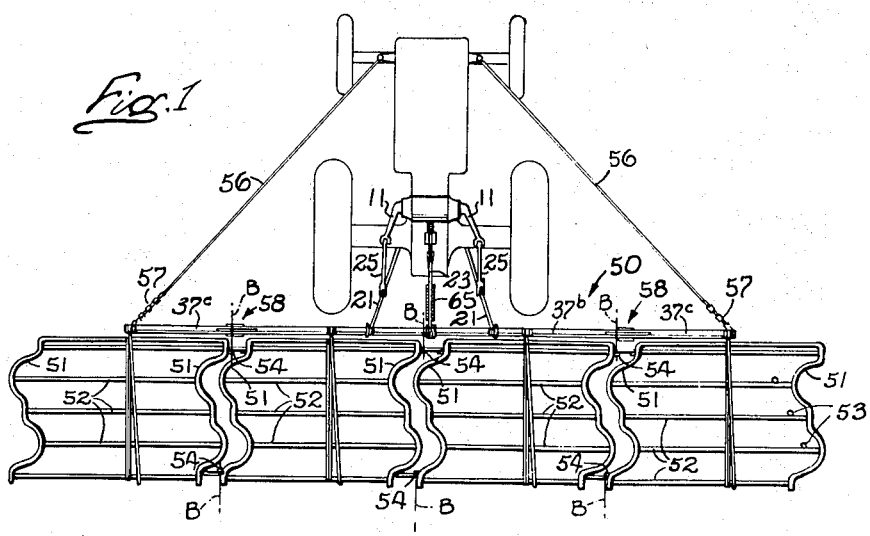
INVENTOR
Frederick C. Warne
By Carlson, Pitzner, Hubbard & Wolfe
ATTORNEYS May 29, 1956   F. C. WARNE   2,747,355
TRACTOR DRAWN IMPLEMENTS
Original Filed June 12, 1944   2 Sheets—Sheet 2
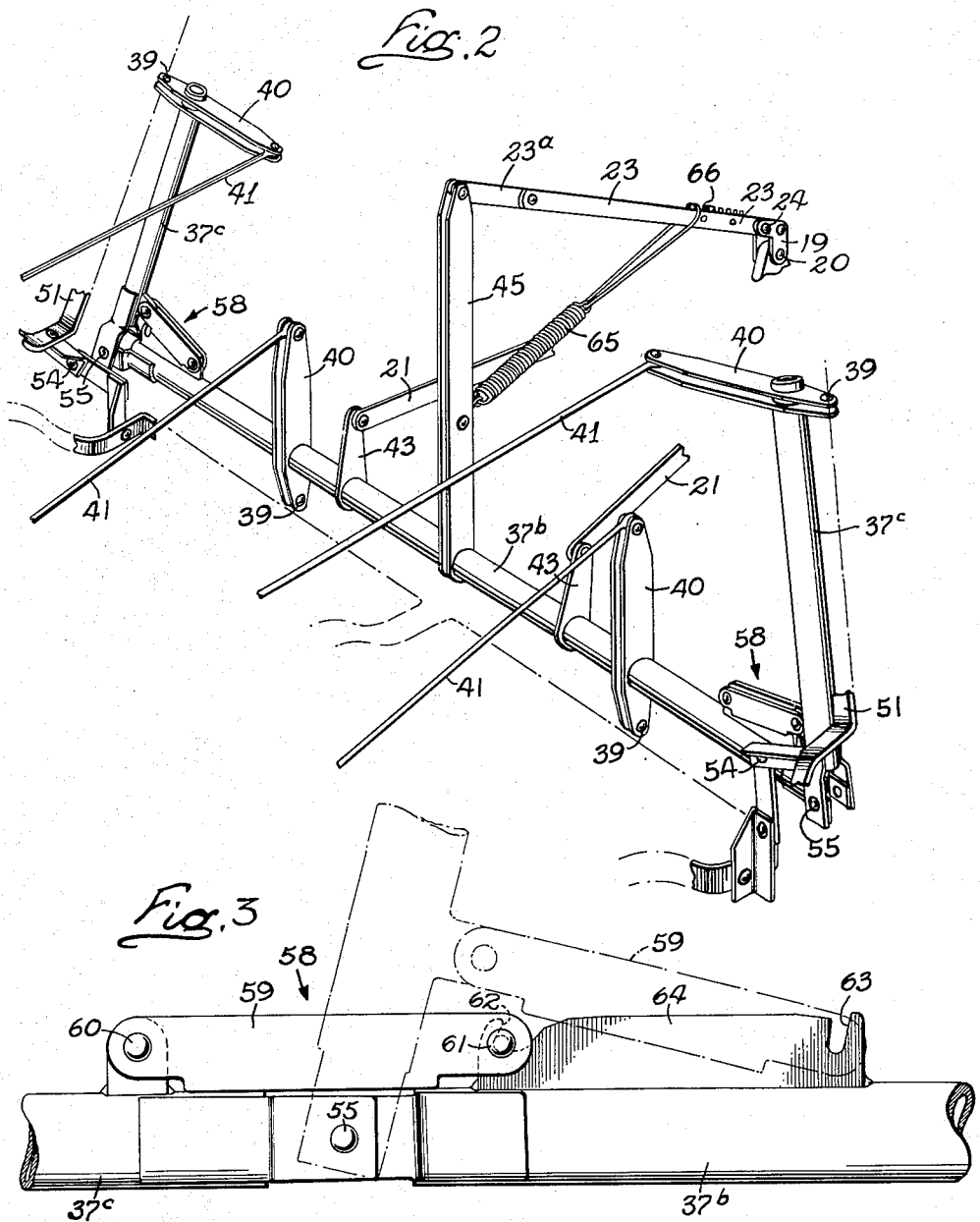
INVENTOR
Frederick C Warne
By Carlson, Pitzner, Hubbard & Wolfe
ATTORNEYS 000# United States Patent Office 2,747,355
Patented May 29, 1956

2,747,355

TRACTOR DRAWN IMPLEMENTS

Frederick C. Warne, Mansfield, Ohio, assignor, by mesne assignments, to Pittsburgh Forgings Company, Coraopolis, Pa., a corporation of Delaware Original application June 12, 1944, Serial No. 539,850, now Patent No. 2,655,854, dated October 20, 1953. Divided and this application February 23, 1952, Serial No. 273,474

2 Claims. (Cl. 55—84)

The present invention pertains to tractor-drawn implements, and more particularly to implements of the type having a plurality of sections at least one of which, during transport, can be swung upwardly from its normal working position to reduce the over-all width of the implement and thus facilitate its movement through gates or other narrow passages.

The present application is a division of my copending application Serial No. 539,850, filed June 12, 1944, now Patent No. 2,655,854, granted October 20, 1953.

One object of the present invention is to provide improved means for latching the implement sections together in either their aligned operating position or their folded transport position.

Another object is to provide an implement of the general character set forth, which embodies a plurality of sections or gangs arranged side-by-side and all adapted to be connected to a tractor through a single connecting mechanism, including a draw bar constructed and arranged to permit the end sections to be locked securely in either a horizontal working position or an elevated transport position.

Still another object is to provide improved mechanism for locking implement sections in working or transport positions which, while effective to retain the sections securely in either selected position, is very easily engaged and disengaged.

Further objects and advantages of the invention will become apparent as the following description proceeds, taken in connection with the accompanying drawings in which:

Fig. 1 is a plan view of a tractor with an implement applied thereto embodying the present invention, such implement in this instance being a four-section pin tooth harrow.

Fig. 2 is an enlarged detail perspective view of the connecting mechanism incorporated in the implement of Fig. 1, the end or wing sections of the drawbar being shown latched in the elevated position which they occupy during transport.

Fig. 3 is an enlarged detail view of the lefthand one of the latch devices included in the mechanism of Fig. 2, indicating in full lines the position the parts occupy when the corresponding wing or end section of the drawbar is located in horizontal or working position, and in broken lines the alternative position the parts occupy when such drawbar section is swung upward for transport.

While the invention is susceptible of various modifications and alternative constructions, I have shown in the drawings and will herein describe in detail certain preferred embodiments, but it is to be understood that I do not thereby intend to limit the invention to the specific forms disclosed, but intend to cover all modifications and alternative constructions falling within the spirit and scope of the invention as expressed in the appended claims.

Referring more particularly to the drawings, the invention has been shown in Fig. 1 as applied in a tractor drawn spike tooth harrow designated generally as 50. The tractor itself may, of course, take a variety of forms and that illustrated herein was chosen simply as being one of well-known commercial design. It embodies, in addition to the usual tractor mechanisms, a power operated lift means which includes a pair of arms 11 fixed to a transverse shaft to swing in unison through a limited arc.

The construction and operation of this and comparable units which afford a source of auxiliary power on the tractor is well-known in the art. For purposes of exemplification and identification, the power unit shown here is substantially the same as that disclosed in Ferguson Patent No. 2,118,180, issued May 24, 1938. A detailed description of the construction and operation thereof is accordingly unnecessary.

Coacting with the power operated lift is a set of three links, the same being mounted on the tractor in the same general manner as the corresponding linkage shown in said Ferguson Patent No. 2,118,180 referred to above. Such linkage includes a pair of tension links 21 projecting in laterally spaced relation from the rear of the tractor and pivoted on the latter to swing laterally, as well as for vertical movement about a horizontal axis lying beneath and somewhat forward of the rear axle. Located generally centrally above this pair of tension links 21, and also projecting rearwardly from the tractor, is a third or compression link 23 pivoted at 24 between the outer ends of the bell cranks 19 to swing laterally and vertically. The tension links 21 are adapted to be raised by the power operated lifter arms 11, being suspended from the latter by depending connecting links 25 which are pivotally connected at their upper ends to the lifter arms and at their lower ends to intermediate portions of the tension links 21.

For very wide harrows or like implements it is desirable that provision be made for folding in the extreme end or side sections over the more centrally located ones during transport so as to facilitate passage through narrow lanes and to increase stability. Fig. 1 shows a plan view of a tractor drawing an implement 50, in this case a pin tooth harrow equipped for the purpose noted. In this particular instance the harrow 50 is shown as comprising four identical gangs or sections each embodying a pair of frame members 51 joined by a plurality of transverse bars 52. Fixed to these bars are the usual depending spike-shaped harrow teeth or pins 53. The frame ends 51 are of more or less sinusoidal shape in order to effect a lateral offset of the pins with respect to each other in successive rows. The adjacent ends of the harrow sections are pivoted to each other at 54 for relative tilting motion about longitudinal axes B—B.

In this instance the drawbar consists of an elongated central section 37b and two wing or end sections 37c, the latter being hinged to the ends of the central section to swing upward and slightly inward with reference to the same by pivot pins 55 (see also Fig. 2). The central drawbar section 37b is connected to the tractor-mounted linkage 21, 23 by arms 43 and 45. Similarly, the frames of the two central sections are connected to the drawbar section 37b by arms 40 and rods 41 and the extreme end section frames are pivotally connected to the drawbar end sections 37c. Stabilizing connections are provided between the extreme outer ends of the drawbar sections 37c and the forward end of the tractor comprising rods 56 and short lengths of chain 57 (Fig. 1).

Secure locking of the drawbar sections 37c and their attached implement frames in either raised or lowered position is accomplished by latch or catch mechanisms 58. As appears in Figs. 2 and 3, each of these latch or catch mechanisms may comprise a pair of bars 59 pivoted at 60 on the corresponding drawbar section 37c and having their outer ends joined by a transverse pin 61 adapted to be received in alternative ones of a pair of notches 62, 63, in a fin or plate 64 fixed to the central drawbar section 37b. When the pin 61 is received in the slot 62 the swingable drawbar section 37c is locked against swinging downward out of alignment with the central section 37b, whereas when the pin 61 is engaged with the other notch 63 the drawbar section 37c is held in the infolded position shown in broken lines in Fig. 3 and in full lines in Fig. 2.

To adjust the implement 50 for transport the operator grasps the frames of the outer sections, one after another, and swings them upward and inward slightly beyond a full vertical position. In the course of such movement each latch pin 61 rides freely up along the sloped inner face of the notch 62 simply as an incident to raising of the outer section (rather than having to be separately freed) and moves on over into engagement with the other slot 63. Then he gets back on the tractor and starts the power lift, raising the lifter arms 11 and attached links 21 so that the central section 37b of the drawbar is elevated. In this way the entire implement 50 is elevated in folded condition and can be transported readily even at fairly high speed.

Provision is also desirably made in the case of such large and heavy implements as the pin tooth harrow shown to prevent the weight of the implement from causing the fore portion of the same from nosing into the ground unduly. To that end a yieldable connection is desirably provided for transferring a portion of the weight to the compression link 23 and thus partially relieving the load on the tension links 21. In the illustrative construction a contractile spring 65 is arranged with its opposite ends anchored respectively to intermediate portions of the upright arm 45 and the compression link 23. To anchor the spring to the latter link the loop on the upper end of the spring is placed in the large notch 66 in an upstanding plate fixed to the link.

From the foregoing it will be apparent that the present invention provides efficient and safe means for effectively latching an implement section in either a working or a raised position. The mechanism is sturdy and reliable in operation and, by reason of its simple construction, is inexpensive to manufacture. Furthermore, it is easily engaged or disengaged by the operator of the tractor.

I claim as my invention:

1. In a ground working implement, the combination of a transverse main drawbar section having an end section hinged thereto, frames with ground working means thereon connected to each of said drawbar sections, a catch mechanism for releasably maintaining the end drawbar section and attached frame in rigid alignment with the main drawbar section to prevent downward movement or alternatively in a rigid raised transport position, said catch mechanism comprising a member secured to one of said drawbar sections and presenting a plurality of spaced abutments with a continuous surface therebetween, and a member secured to the other of said drawbar sections presenting a hook member engageable with one of the abutments to retain the drawbar section in rigid alignment against downward movement such that the end drawbar section may only move upward, the hook member being freely movable out of engagement with said one abutment by a vertical swinging movement of the end section and adapted to ride along said continuous surface and freely engage with other of said abutments after the end section has been swung upward to the raised transport position, said last named abutments rigidly retaining said hook member such that a horizontal force inwardly or outwardly on the elevated end section will not dislodge the hook member from the abutments.

2. In a ground working implement, the combination of a transverse main drawbar section having an end section hinged thereto, frames with ground working means thereon connected to each of said drawbar sections, a latch mechanism for releasably maintaining the end drawbar section and attached frame in rigid alignment with the main drawbar section to prevent downward movement or alternatively in a rigid raised transport position, said latch mechanism comprising a member secured to one of said drawbar sections and presenting a plurality of spaced abutments, and a member secured to the other of said drawbar sections presenting a hook member engageable with one of the abutments to retain the drawbar section in rigid alignment against downward movement such that the end drawbar section may only move upward, the hook member being freely movable out of engagement with said one abutment by a vertical swinging movement of the end section and freely engageable with another of said abutments, after the end section has been swung upward to the raised transport position, said last named abutment rigidly retaining said hook member such that a horizontal force inwardly or outwardly on the elevated end section will not dislodge the hook member from the abutment.

References Cited in the file of this patent

UNITED STATES PATENTS

| | | |
|---|---|---|
| 597,480 | Fellows | Jan. 18, 1898 |
| 724,505 | Riemenschneider | Apr. 7, 1903 |
| 950,421 | Adix | Feb. 22, 1910 |
| 1,034,558 | Adix | Aug. 6, 1912 |
| 1,144,503 | Pounder | June 29, 1915 |
| 1,148,791 | Nelson | Aug. 3, 1915 |
| 1,308,938 | Donovan | July 8, 1919 |
| 1,535,668 | Jostedt | Apr. 28, 1925 |
| 2,141,685 | Drennan | Dec. 27, 1938 |